Dec. 2, 1947. C. T. ASBURY 2,431,981
ANTI-SKID DEVICE
Filed May 23, 1946
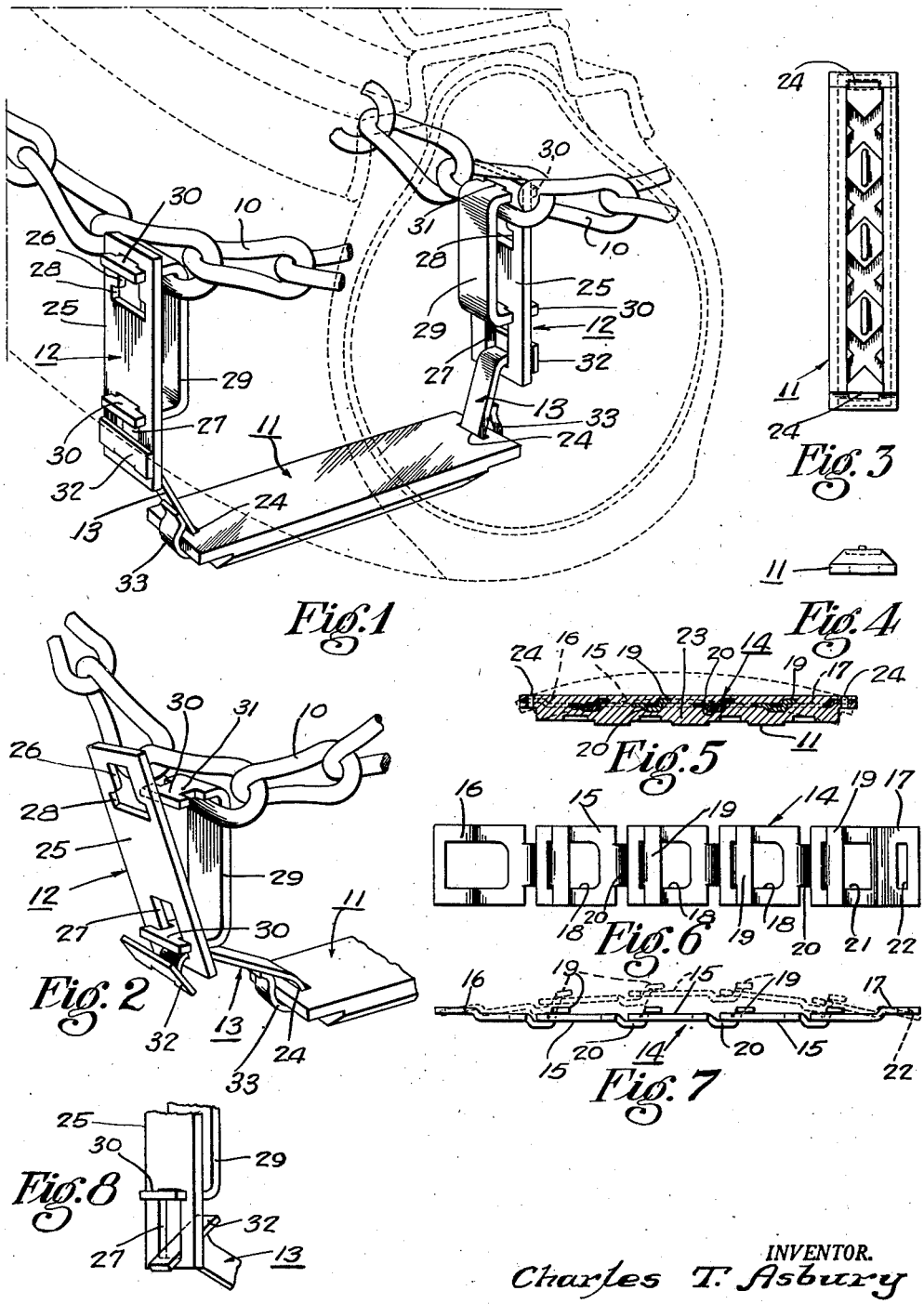
INVENTOR.
Charles T. Asbury
BY HIS ATTORNEYS
Howson + Howson Patented Dec. 2, 1947

2,431,981

UNITED STATES PATENT OFFICE 2,431,981

ANTISKID DEVICE

Charles T. Asbury, Fort Lauderdale, Fla.

Application May 23, 1946, Serial No. 671,797

4 Claims. (Cl. 152—221)

This invention relates to anti-skid devices for vehicle wheels and more particularly to that type of anti-skid device in which a pair of annular flexible members, adapted to be arranged at opposite sides of the vehicle tire, are connected by a rod-engaging cross-member.

An important object of the invention is the provision in a device of this character of a cross-member which will be very durable in service and which will have proper engagement both with the vehicle tire and the road surface.

A more specific object of the invention is the provision of a cross-member composed of a wear-resisting substance, such as rubber, having embedded therein a reinforcing element through which the body material of the cross-member is bonded, the reinforcing element being of such character that it will permit flexing of the cross-member in response to engagements causing indentations of the tire but will be relatively inflexible in the opposite direction so that it will at all times present a relatively flat surface to the road.

Another object of the invention is the provision of an inexpensive and readily assembled attaching means for connecting such cross-members to the annular side-members.

These and other objects I attain by the construction shown in the accompanying drawings, wherein:

Fig. 1 is a fragmentary perspective view of an anti-skid device constructed in accordance with my invention;

Fig. 2 is a fragmentary perspective illustrating the means for connecting the cross-members to and disconnecting them from the side-members;

Fig. 3 is a bottom plan view of a cross-member;

Fig. 4 is an end elevation thereof;

Fig. 5 is a longitudinal sectional view therethrough;

Fig. 6 is a plan view of the reinforcing element;

Fig. 7 is a side elevation thereof; and

Fig. 8 is a perspective view illustrating the method of connecting cross-members attaching element to the connectors.

Referring now more particularly to the drawings, the numeral 10 designates annular side-members, usually chains; 11, cross-members to extend across the tread of the tire; 12, a connector for connecting the ends of a cross-member to the side-members 10; and 13, an attaching element for connecting the connector and cross-element.

The cross-elements 11 each comprise a reinforcing member 14 consisting of intermediate links 15 and end links 16 and 17. The intermediate links each consist of a body portion having a slot 18 and having at one end a T-shaped extension 19, the head of the T of which may be engaged in the slot 18 of a succeeding link and when engaged therewith, lie flatly against the surface of the link when the elements are alined in one direction. In order that the structure may be substantially flat, each link has a neck portion 20 of the T-head offset downwardly so that the body portions of the links will, in the normal position of the reinforcing element, be in alinement with one another. This connection will, however, permit ready flexing of the reinforcing element in a direction corresponding to an indentation of the engaged portion of the tire such as would result from passage of the cross-member of an obstruction. The end-member 16 is, in all essentials, a duplicate of the intermediate links while the end-member 17 has, in addition to the slot 21 receiving the head of the adjacent intermediate link, a slot 22 adjacent its free end which is adapted for the passage of the associated attaching element 13. This reinforcing element is completely embedded in a suitable elastic wear-resistance substance 23 such as rubber or its synthetic equivalents. In molding the rubber upon the insert, openings are left at the ends of the molded product as at 24, these openings alining with the slot 22 of the end member 17 and with the outer end of the slot of the end-member 16.

The connector 12 comprises a narrow plate 25 having longitudinally extended slots 26 and 27 adjacent opposite ends thereof, the slot 26 having an enlarged inner end 28 for a purpose presently to appear. Associated with this plate is a U-shaped member 29 the arms of which embody enlarged heads 30 adapted to be arranged at the opposite face of the plate from the U shaped member proper, these heads being connected by reduced necks 31 which may shift in the slots 26. The U-shaped member and the slots 26 are so constructed that when the arms are arranged at one end of the slot, the head 30 of the arm engaged in slot 26 may be passed through the enlarged portion 28 of the slot thus disconnecting the corresponding ends of the U-shaped member 25 and plate 29 to enable the U-shaped member to be passed through a link of the side-member 10. The head engaged in the other of the arms 27 may be engaged with or disengaged from its slot by rotating the U-shaped member to a position substantially at right angles to plate 12.

In order to normally prevent the arm engaged in slot 27 from shifting to a position which will permit the head of the other of the arms to be passed through opening 28, the connector 13 is provided with a head 32 which obstructs movement of the U-shaped member to what may be termed a releasing position. Any such tendency to movement will, furthermore, be resisted by the strain placed by the side-member 10 upon the U-shaped member which will normally maintain the U-shaped member in the position illustrated in Figure 1, the attaching element 13 formed of malleable material and has its terminal pass through the associated opening 24 and bent back to form a substantially closed loop as at 33.

By constructing the reinforcing member 14 so that it is permitted to flex in the direction of the tire in response to engagements causing indentations of the tire but is rendered relatively inflexible in the opposite direction away or out from the tire as described, any tendency is eliminated for the reinforcing member to be thrown outwardly from the tire by centrifugal force with resultant "slapping" against the roadway before the tire runs over it, for example, as occurs in conventional type chains wherein cross-chains or connections are flexible in both directions.

Since the construction illustrated is obviously capable of considerable modification, I do not wish to be understood as limiting myself thereto except as hereinafter claimed.

I claim:

1. In a cross-member for vehicle tires, a flexible molded strip, said strip being normally substantially flat and being adapted to extend transversely of and in engagement with a tire tread, and a longitudinal internal reinforcement for said strip which is flexible under impact tending to force it into the tire tread and relatively inflexible to deformation of the strip in the opposite direction.

2. In a cross-member for vehicle tires, a flexible molded strip adapted to extend transversely of and in engagement with a tire tread and a longitudinal internal reinforcement for said strip which is flexible under impact tending to force it into the tire tread and relatively inflexible to deformation of the strip in the opposite direction, said reinforcement comprising links each having a head and having an opening for the passage of the head of an associated link.

3. A connector for the cross-members and side-members of tire chains comprising a narrow plate having a longitudinally elongated slot adjacent one end thereof and adjacent the other a T slot the head of which is disposed at that end thereof nearest the first-named end of the plate, a U-shaped member for engagement with the side-member the ends of the arms of which comprise T-heads spaced apart a distance approximately the distance between corresponding ends of the slots of said plate, the stems of which are shiftable longitudinally of the first-named slot and stem portion of the T-slot, the head of the T engaged in the T-slot being alineable with and movable through the head of the T-slot when the other T is disposed at the remote end of its slot, and cross-member connecting means engaged in the last-named slot and normally preventing movement of said other T to such position.

4. A connector for the cross and side-members of tire chains comprising a plate having spaced longitudinal slots, a U-shaped member having heads at the ends of the arms thereof adapted to be disposed at the opposite face of the plate from said U-shaped member and connected to the arms of said U-shaped member by reduced portions slidable in said slots, one of said slots having at one end an enlargement permitting passage of the associated head and means engaged with said plate normally preventing movement of the U-shaped member to aline said head with said enlargement.

CHARLES T. ASBURY.

REFERENCES CITED

The following references are of record in the file of this patent:

UNITED STATES PATENTS

| Number | Name | Date |
|---|---|---|
| 1,453,183 | Robinson | Apr. 24, 1923 |

FOREIGN PATENTS

| Number | Country | Date |
|---|---|---|
| 49,564 | Norway | Nov. 2, 1931 |
| 303,018 | Great Britain | Aug. 7, 1929 |